June 20, 1939. M. SCHWARTZ 2,163,159
RANGE FINDER ATTACHMENT FOR CAMERAS
Filed July 30, 1936 3 Sheets-Sheet 1

INVENTOR.
Morris Schwartz
BY Louis Cooper
ATTORNEY.

June 20, 1939.　　　　M. SCHWARTZ　　　　2,163,159
RANGE FINDER ATTACHMENT FOR CAMERAS
Filed July 30, 1936　　　　3 Sheets-Sheet 2
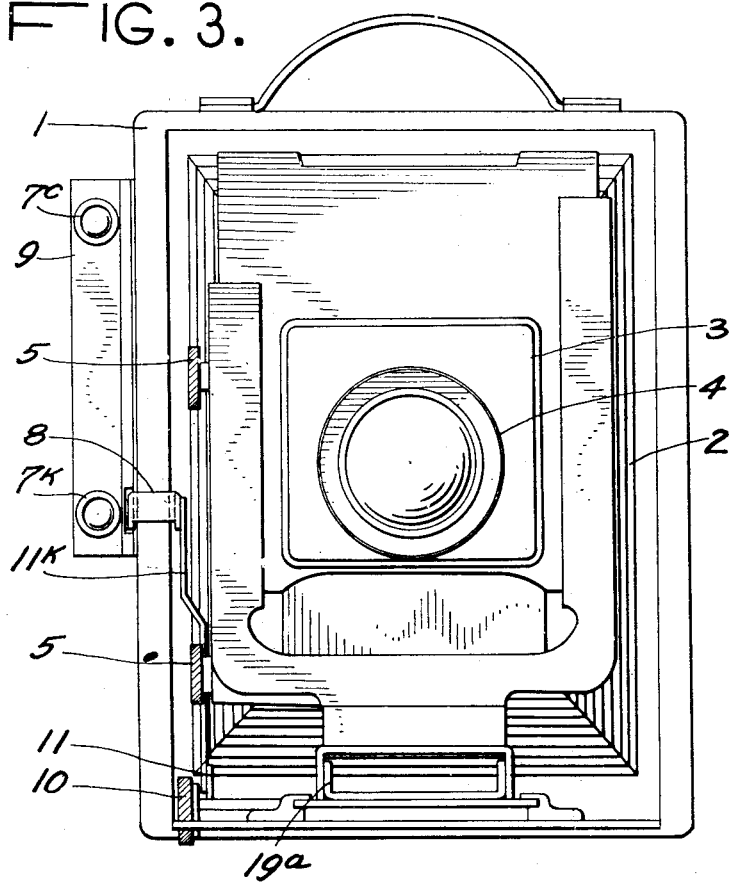
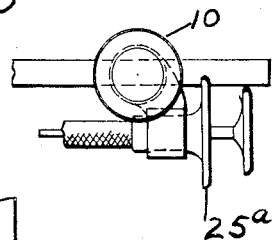
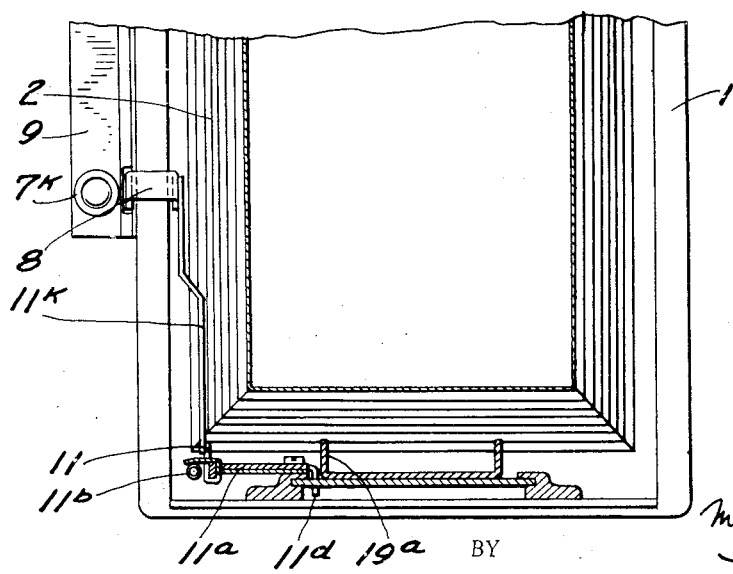
INVENTOR.
Morris Schwartz
Louis Casper
ATTORNEY.

June 20, 1939.   M. SCHWARTZ   2,163,159
RANGE FINDER ATTACHMENT FOR CAMERAS
Filed July 30, 1936   3 Sheets-Sheet 3
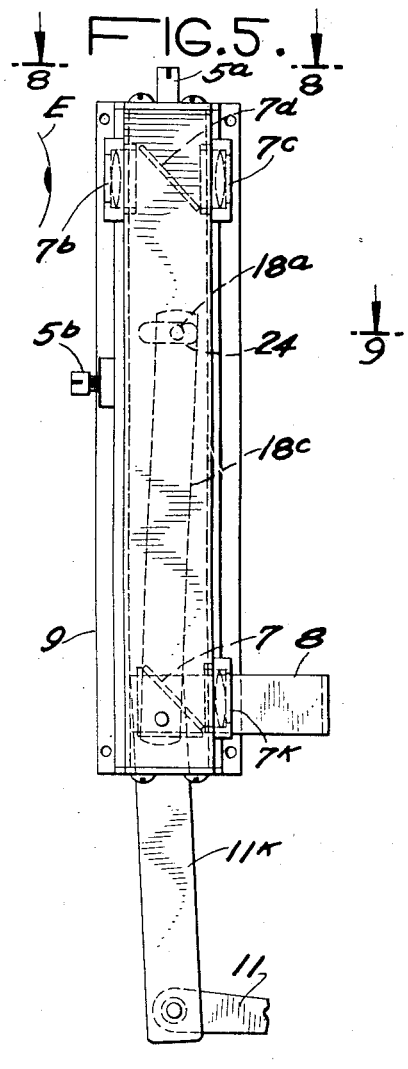
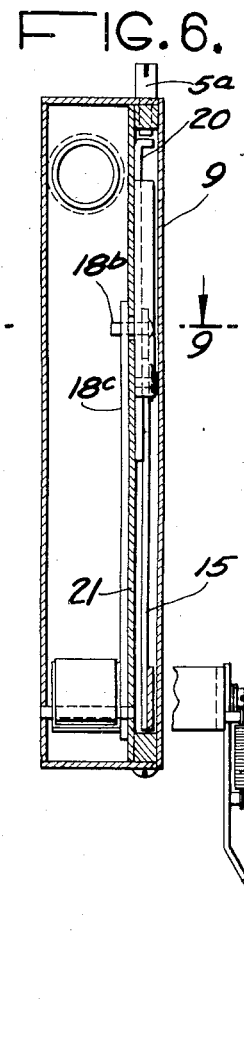
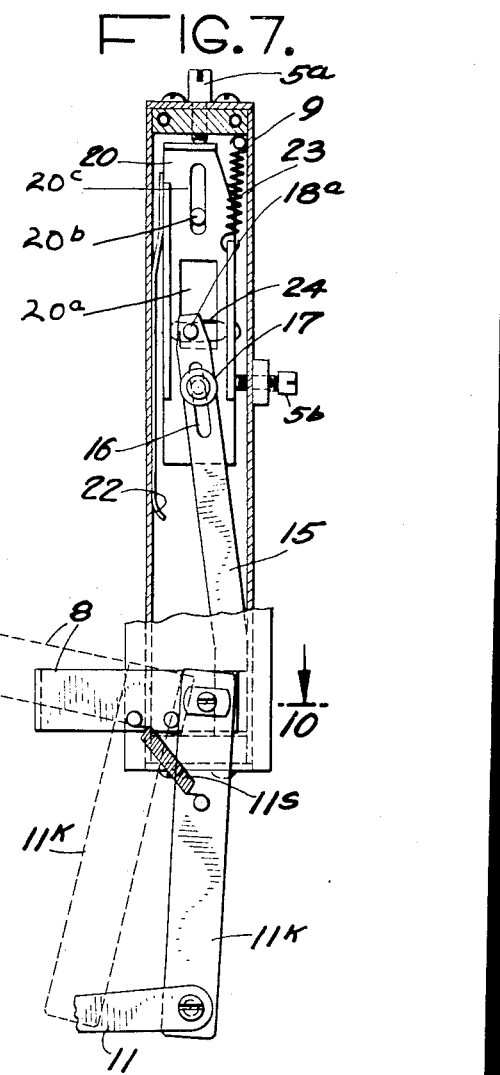
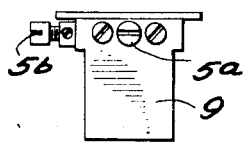
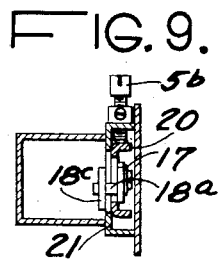
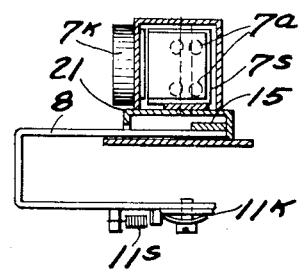
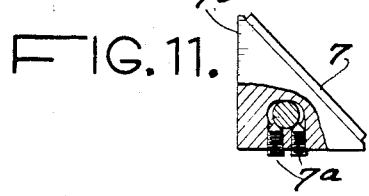
INVENTOR.
Morris Schwartz
Louis Casper
ATTORNEY.

Patented June 20, 1939

2,163,159

UNITED STATES PATENT OFFICE 2,163,159

RANGE FINDER ATTACHMENT FOR CAMERAS

Morris Schwartz, Brooklyn, N. Y.

Application July 30, 1936, Serial No. 93,503

9 Claims. (Cl. 95—44)

My invention relates to a novel apparatus attachable to a camera by which means the camera may be focused with accuracy and said focusing may be accomplished in a comparatively simple manner.

My invention comprises a range finder that is adaptable to and is easily attachable to most types of cameras.

An object of this invention is to provide means in said apparatus for observing that which appears to be two images of one single object, and by adjusting said means in said camera to cause the viewing of the two images aforesaid to be merged into one single image. When this adjustment is accomplished, the result will be a perfect focus of the object or objects viewed by the camera aforesaid.

Other and further objects will appear in the specification and will be specifically pointed out in the appended claims reference being had to the accompanying drawings exemplifying the invention in which—

Fig. 3 is a front view of the camera on a line 3—3 of Fig. 1 showing the range finder or viewing attachment 9 in position upon said camera; also the adjusting slide levers and arms in connection therewith.

Fig. 4 is a front sectional view of the camera on a line 4—4 of Fig. 1, said view showing the manner of the connection of the sliding bar 11$^k$ and the sliding track of the camera.

Fig. 5 is a side view detail of the range finder or viewing arrangement. The viewing is made by the eye E through the aperture 7$^b$.

Fig. 6 is a front view detail of the range finder or viewing arrangement.

Fig. 7 is a further detail view of the range finder showing the adjusting screw 5$^a$ and other adjustable means for adjusting the position of the sliding member 20.

Fig. 8 is a detail of the upper section of the range finder proper on a line 8—8 of Fig. 5.

Fig. 9 is a detail plan view of the range finder on a line 9—9 of Fig. 6.

Fig. 10 is a detail of the lower reflector mirror 7 showing the adjustment thereof.

Fig. 11 is a sectional side view detail of the lower mirror reflector 7 which is attached to the bar 18$^c$.

Fig. 12 is a detail of an attachment for simultaneously operating the slide focusing screw 10 with the manipulation of the cable release 25$^a$, said cable release operating the shutter of the lens 4.

Figure 1:
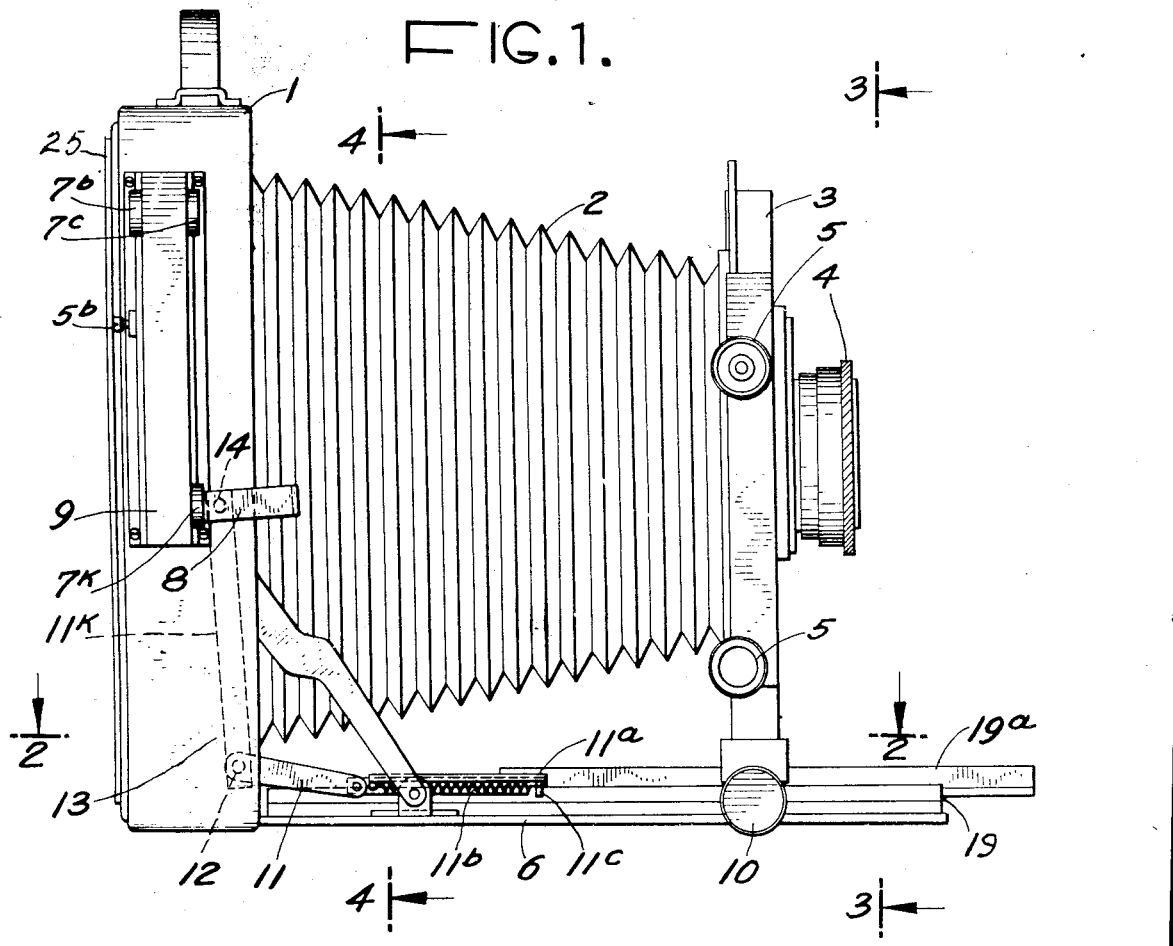
Fig. 1 is a side view of a camera with the range finder viewing arrangement attached thereto.

Referring to the drawings, the numeral 1 is a camera proper, 2 is the camera bellows, 3 is the lens board, 5 are adjusting screws on the lens board 3 for adjusting the position of the lens 4. 6 is the bed of the camera, 9 is a casing enclosing the viewing attachment or range finder proper said casing being attached to the side of the camera proper as shown in Figs. 1 and 3. Said viewing attachment is provided with two reflector mirrors, viz. the upper reflector mirror 7$^d$ and the lower reflector mirror 7. The lower reflector mirror 7 resting upon an adjustable base 7$^a$ is provided with a solid silvered surface, said base is adjustable as to angle by means of four set screws 7$^a$ (see Figs. 10 and 11).

The upper reflector mirror 7$^d$ is semi-transparent, the semi-transparency aforesaid made possible by silver coating the surface of said reflector only slightly.

The thin application of the silver coating applied upon the reflector mirror 7$^d$ as stated makes it possible to view directly an image other than that is reflected upon the mirrored surface. In this manner the user of the camera is enabled to view two images simultaneously of the same object on the reflector 7$^d$, one image being thrown up from the lower reflector 7 which receives the reflection of the viewed image through the aperture 7$^k$ and the second image appearing directly from the object that is being viewed, the latter being viewed directly through the semi-transparent glass of the reflector 7$^d$. The direct view of said image is seen through the reflector aforesaid through the viewing aperture 7$^b$ by the eye E, the direct view coming through the aperture 7$^c$.

In order to merge both images into one viewing, the focussing adjustment screw 10 of the camera is turned in either direction to suitably move the lens board 3 backward or forward. The aforesaid movement not only moves the lens forward and back, but also operates the mechanism of the range finder and carries with it certain attached levers and arms between the camera proper and the range finder viewing attachment. The functions of said levers and arms will be hereinafter explained.

When the images viewed on the reflector 7$^d$ and the direct image viewed through the viewing apertures 7$^b$ and 7$^c$ are merged into one image, the object viewed is in focus, and the usual exposure can then be made.

The turning of the adjusting screw 10 moves the lens board 3 in the usual manner of cameras which moves the coupled parallel bars 19ª that slide in grooves 19 upon the bed 6 of said camera. The lens board 3 rests upon and moves with the parallel bars aforesaid. Said lens board is attached to the bellows 2 the latter following the movement of the lens board aforesaid. The lens board 3 is provided with an infinity stop, said stop being usually adjusted for a viewing distance exceeding 100 feet on the viewing scale, the latter scale being usually provided on all cameras to which said range finder viewing arrangement applies.

The lens board 3 is brought out or adjusted initially up to the said infinity stop, and all other adjustments are thereafter made by the rack and pinion of the camera or any other means provided on the camera for regulating the focusing distance. The foregoing adjustment as described is obtained by turning the focusing screw 10 as already mentioned.

Figure 2:
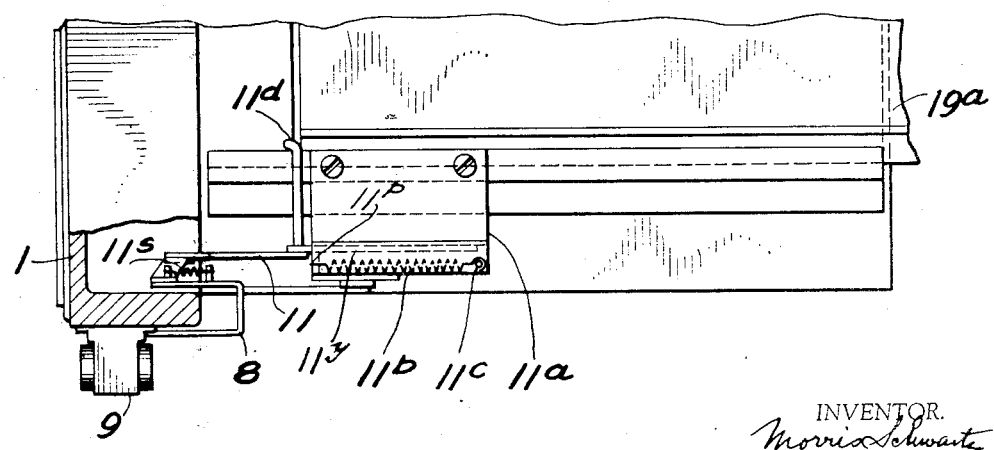
Fig. 2 is a plan view section of the camera on a line 2—2 of Fig. 1 showing the sliding members that operate the range finder or viewing arrangement.

Attached to one side of the supporting base plate 19 is a stop plate 11ª which is secured to said base plate by means of a pair of screws shown in Fig. 2. Contiguous to said stop plate is a coiled spring 11ᵇ which is secured to said stop plate by being looped around the pin 11ᶜ in the manner shown in Figs. 1 and 2. The opposite end of the spring 11ᵇ is looped around a pin 11ᵖ the latter pin being secured to the slide rod 11ʸ, the said slide rod moving slidably in a channeled space underneath the stop plate 11ª. The rod 11ʸ is pivotally attached to a lever arm 11. A bent rod 11ᵈ is pivotally attached to the rod 11. The slide rod 11ʸ aforesaid, affords stability in the reciprocal movement of both the bent rod 11ᵈ and the associated lever arm 11. A coiled spring 11ˢ is secured between the looped bar 8 and the arm 11ᵏ said spring causing said lever arm 11 to retract to normal position on the retraction of the bellows 2 and the objective carrier 3. The latter function serves to cause said arm 11ᵏ and lever 11 to remain resiliently and retractibly conformable to whatever position they may be moved consequent to the movement of the lens carrier aforesaid.

The purpose of the looped bar 8 with its associated arm 11ᵏ and lever 11 is to enable an efficient linkage arrangement between the range finder proper (said range finder being mounted exteriorally on the camera body), and the lens carrier. Said linkage arrangement does not in any manner require the piercing of the camera body wall that is contiguous to the aforesaid linkage arrangement. The said looped bar 8 serves as a connecting medium between the swinging arm 15 situated within the range finder casing 9 and the lever linkage arrangement which includes the arm 11ᵏ and lever arm 11 inside the wall of the camera body 1.

With a linkage arrangement such as described, it is possible to mount the range finder comprising the invention upon most makes of cameras without mutilating or defacing said camera consequent to said range finder mounting. The said rod is bent over so that the rear end section of the parallel bar 19ª (Fig. 1) strikes the said bent rod and carries the latter with it when said parallel bar moves backward toward the inner section of the camera. As the parallel bar 19ª moves forward, the coiled spring 11ᵇ causes the bent rod and with it the lever 11 to follow said bar 19ª. The bent rod reaches its forward limit of travel when it strikes the inner edge of the stop plate 11ª.

The rod 11ᵈ as stated is intergrally connected to the lever arm 11. Said lever arm is pivotally connected with the arm 11ᵏ and said arm in turn is pivotally connected to the looped bar 8. The looped bar 8 is secured to a swinging arm 15 that swings on a pivot provided by the screw and washer 17. The swinging arm 15 is provided at its top section with a circular boring or hole 18ª through which a pin 18ᵇ projects. (See Fig. 6). Said pin is integrally attached to the bar 18ᶜ and bears loosely in the boring or hole 18ª, therefore, as the arm moves the bar 18ᶜ will also move with said arm. The base 7ˢ of the reflector mirror 7 is pivotally attached to the reflector bar arm 18ᶜ at the lower end thereof. (See Fig. 5.)

A screw 17 having a washer underneath said screw is mounted through an elongated slot 16 of the swinging arm 15, and is screwed into the adjustably slidable plate 20. The said arm 15 pivotally swings on the screw 17. The sliding plate 20 is set in slidable position against the walls of the outer section of the partition 21 of the range finder 9.

The sliding plate 20 is held in a lateral resilient position by means of the flat spring 22. The plate 20 is adjustably moved in an upward position and against the screw 5ª by means of the coiled spring 23.

A retractile spring 11ˢ is mounted between the looped bar 8 and the arm 11ᵏ as shown in Figs. 6 and 7. The arm 11ᵏ being pivoted to the bar 8 is movable thereon, said movement, however, being limited to an outwardly direction with respect to the bar 8. The arm 11ᵏ is prevented from moving inwardly with respect to said bar by reason of the pin that supports said spring 11ˢ at its upper end, said pin also acting as a limiting stop for the arm 11ᵏ. The purpose of the spring 11ˢ is to facilitate the return movement of the arm 11ᵏ against the pin aforesaid upon the retraction of the objective carrier 3.

The pin 18ᵇ is integrally secured to the reflector arm 18ᶜ, said reflector arm being situated in the space within the attachment 9 and behind the partition 21 as shown in Fig. 6.

The adjusting plate 20 is slidably placed against the outer section of the partition 21 and is held resiliently in position by means of the flat spring 22. The plate 20 has an opening 20ª and is held in a normal upward and resilient position by means of the coiled spring 23. The adjustable screw 5ª is employed as an adjustment limiting the upward limit stop of the slidable plate 20. The stop pin 20ᵇ projecting above the slot 20ᶜ of the sliding plate 20 serves to hold the slidable plate 20 in the position it is placed by the adjustments of the screws 5ª and 5ᵇ. Likewise the adjustable screw 5ᵇ also serves to hold the slidable plate 20 in position and against the flat spring 22 of said plate. The partition wall 21 is provided with an oval shaped slot 24 to provide sufficient sidewise movement of the pin 18ª which as stated is integral to the reflector arm 18ᶜ. The slot 16 permits free movement of the plate 20 up or down, the screw 17 being free to move vertically in said slot when the slidable plate is being moved by adjusting the screw 5ª.

The function of the arrangement shown in Fig. 7 is to provide adjustments for different sizes of lens that may be attached to a specific camera. For instance, a 6 inch lens will require a greater sweep of the bar 11ᵏ than that of a 3 inch lens; and also a corresponding increase of leverage of the bar or arm 15 will become necessary. For this reason the adjustments as shown in Fig. 7 and described herein are made applicable to conform to different sizes of lens as stated.

The plate 20 is slid downward said movement affecting the leverage of the bar or arm 15. The screw 5ᵇ also provides a means for adjusting the plate 20 sidewise.

Should any focusing variation occur in the setting of said viewing arrangement 9 on the camera, the same may be corrected by means of the set screw 5ᵇ.

In order to provide a convenient means to assist the user of the camera as described in making rapid exposures after the viewing through the range finder is completed, the arrangement as shown in Fig. 12 is provided.

In this figure the support to the adjusting screw 10 is joined to the cable release 25ᵃ by means of one jointure, said jointure may either be a casting, drop forging or other substantial metallic member to hold said cable release and the screw arrangement 10 in one compact and substantial unit.

The cable release 25ᵃ is connected to the camera lens in the usual manner.

The operation of the camera with said range finder arrangement attached to the same is as follows:

The user observes the object to be photographed through the aperture 7ᵇ. On observing one direct image through the said apertures 7ᵇ and 7ᶜ and another image of the same object viewed reflected from the reflector 7 to the reflector 7ᵇ, the user turns the focusing screw 10 in either direction until a point is reached when both images are merged. The adjustment aforesaid causes the bellows 2 to expand or contract according to the focus required. With the consequent movement of the parallel bars or track 19ᵃ in the grooves 19 said bars carry with them the bent rod 11ᵈ, the slide rod 11ᶠ and the lever arm 11. This movement causes the arm 11ᵏ to swing on pivot 14 and carrying with it the looped arm 8. The looped arm 8 causes the swinging arm 15 to swing within the confines of the oval slot 24. The swing of said arm causes the reflector arm 18ᶜ to move being impelled through the medium of the pin 18ᵇ which is attached to said reflector arm and which projects through a hole through the top section of the swinging arm 15. The movement of the reflector arm 18ᶜ causes the mirror reflector 7 to move upon a pivot bearing thereby causing the reflected view from said mirror reflector 7 to move correspondingly upon the mirrored surface of the reflector 7ᵈ.

When the camera is in focus both the focusing adjustment of the lens board 3 and with it the lens 4, and the merging of the two views on the reflector 7ᵈ in said range finder attachment and merged into one single view. The adjustments aforementioned are made with the adjusting screw 10 said screw performing the dual function as stated.

The focusing limit of the camera as described is not confined to the focusing limit of the range finder 9. This feature of the invention is due to the fact that when the adjusting screw 10 is turned sufficiently forward to cause the track or parallel bars 19ᵃ to reach the limit stop of the rod 11ᵈ, the parallel bars 19ᵃ may still extend outwardly and thereby moving the lens board 3 and with it the bellows 2 further forward toward the object viewed. When this action occurs the range finder attachment adjusting means is automatically disengaged from the camera focusing means due to the fact that the forward limit stop of the rod 11ᵈ had been reached as already stated.

The release of the range finder attachment adjusting means from the normal focusing arrangement of the camera is especially desirable in focusing images upon the ground glass 25 for near distances. It is obvious that the disengagement of the range finder attachment means as described is desirable for "close ups" since a range finder of this description is not intended for near distance work.

A further feature of the invention is that it is possible to provide a means to double check the accuracy of the range finder by checking the latter with the viewing of the objective upon the ground glass 25 situated at the back of the camera.

Any inaccuracy on the part of the range finder can thus be corrected by means of adjusting the screw 5ᵇ in said range finder 9.

A further feature of the invention is the adjustment of the screw 5ᵃ in said range finder, the latter enabling corrective adjustments to be made of the range finder with regard to adapting the latter to different sizes of lens. The aforesaid adjustment of the screw 5ᵃ is made without removing said range finder attachment from the camera aforesaid.

It will thus be seen that the range finder herein described is coupled directly to the track of the camera so that by turning the focusing screw 10 not only moves the lens forward and back, but also operates the mechanism of the range finder thus automatically synchronizing it with the lens. No other motions are required than used in normally operating the camera. The camera is simply opened and the lens standard is brought forward to the infinity stop, the latter being common in most cameras. The object to be photographed is then observed through the eye piece E of the range finder and the focusing screw of the camera is turned. When two separate images of the objects which are visible in a bright luminous circle are superimposed, perfect focus is obtained. Pressure on the cable release will make the exposure and result in a critically sharp photograph.

It will also be seen from the foregoing description that this invention is capable of considerable modification without departing from the spirit of the invention. For instance, the arm 11ᵏ lever arm 11 and associated parts as illustrated in Fig. 7 may be modified or rearranged to perform the service of adapting said range finder to different sizes of lens; also in the adjustment feature in merging two separate images of an object into one single image of the object aforesaid.

Now, having described my invention, what I claim is—

1. In a folding camera, an enclosed container attachable thereon, said container including therein a movable reflector and a fixed reflector for viewing objects exterior to said camera, the viewed image of said object being thrown upon said movable reflector through an aperture in said container, the reflection of said viewed objects upon said movable reflector being projected in turn upon said fixed reflector, said fixed reflector being silvered in a manner to render said reflector transparent to direct viewing through adjacent apertures in said container thereby producing a duplicate image of said objects upon said fixed reflector, said movable reflector movable upon a bearing within said container, said reflector attached to a swinging bar also within said container, said bar operably attached to and made movable by a looped bar, said looped bar projecting outwardly from said container through an opening thereof and extending astride the edge of the side wall of said camera, said looped bar pivotally attached to lever arm means, said lever arm means situated within said side wall of said camera and contiguous to the objective carrier of said camera, said carrier made adjustably movable by means of a focusing screw attached to the bed of said carrier and operably engaging said carrier, the adjustment thereof serving to move said carrier forward and back and likewise causing said movable reflector in said container to move correspondingly through the medium of said looped bar and lever arm means connected therewith.

2. In a folding camera, an enclosed casing exteriorally attached thereon, said casing including therein reflector viewing means, said viewing means having movable and fixed reflector elements, said movable reflector element movable upon a pivot bearing and attached to a swinging bar within said casing, said bar pivotally attached to and made movable by linked arm means extending through an opening of said casing, said linked arm means operably attached to a sliding bar, said sliding bar mounted beneath a stop plate, said stop plate mounted on the bed of said camera and contiguous to the objective carrier of said camera; spring means attached to said sliding bar to cause said bar to follow the forward movement of said carrier, a cross rod integral to said sliding bar, said rod operably contiguous to said carrier and remaining contiguous thereto up to the stopping limit of said rod, and when said stopping limit of said rod shall have been reached said reflecting viewing means are completely disconnected from said carrier upon the further forward movement of the carrier aforesaid.

3. A range finder exteriorly attachable to a folding camera, said attachment including an enclosed casing, said casing having reflector viewing means contained therein, said viewing means having movable and fixed reflector elements, a swinging bar within said casing attached to the movable element of said reflector means, said swinging bar pivotally attached to a swinging lever arm within said casing, said lever arm moving upon a bearing also within said casing, screw means for adjustably moving the position of said bearing whereby the fulcrum relation of the swing of said lever arm may be adjusted, said lever arm attached to a looped bar movable through an aperture in said casing, said looped bar being looped astride the side wall of said camera and pivotally connected to linked arm means contiguous to said side camera wall, said linked arm means also contiguous to and cooperating with the means for adjusting the objective carrier of said camera within the adjusting limit of the linked arm means aforesaid.

4. In a folding camera including an objective carrier, means for adjusting said carrier, an enclosed casing attachable to said camera, said casing including reflector viewing means therein, said viewing means including stationary and movable reflector elements, a swinging bar within said casing attached at one end thereof to the movable element of said reflector means, said swinging bar pivotally operable at the opposite end thereof with a swinging lever arm within said casing, said lever arm movable upon a screw bearing, said bearing being secured into an adjusting plate within said casing for moving said bearing in either vertical or lateral direction, said lever arm attached to a looped bar, said looped bar extended through an opening in said casing and exterior to said camera wall and disposed astride the edge of the side of said wall, said looped bar in turn pivotally attached to linked arm means within said camera wall, said linked arm means contiguous to and moved by said means for adjusting the objective carrier aforesaid.

5. In a folding camera including its objective carrier, means for moving said carrier for focussing an objective, an enclosed casing attachable to said camera, said casing including reflector viewing means therein, said viewing means including stationary and movable reflector elements, a swinging bar mounted within said casing and attached to the moving element of said reflector means, said swinging bar pivotally operable by a swinging lever arm, said lever arm movable upon a bearing, within said casing, said bearing affixed into an adjusting plate also within said casing, screw adjusting means for adjusting said plate for either vertical or sidewise position, said swinging lever arm attached to linked arm means, said linked arm means extending through an aperture in said casing and disposed astride the edge of the side wall of said camera and further extending within said wall and made conformable to and moved by means for adjusting said objective carrier of the camera aforesaid.

6. The structure as set forth in claim 3 and a stop plate mounted on the bed plate of said camera and contiguous to said carrier, said stop plate for the purpose of limiting the travel of said linked arm means whereby said linked arm means may be stopped while said objective carrier means may be moved forwardly on said camera and beyond the stopping limit of the lever linked arm means aforesaid as set forth.

7. In a range finder for a folding camera, said range finder including an enclosed casing exteriorally attachable to said camera, said casing having contained therein viewing means enabling the viewing of duplicate images of a single object through spaced apertures in said camera, said viewing means including stationary and movable reflector elements, a swinging bar pivotally mounted within said casing, said bar attached at one end thereof to the moving element of said viewing means, said swinging bar made operable through the medium of a swinging lever, said lever movable upon a bearing, said bearing affixed upon an adjustable plate within said casing, said swinging lever attached to a looped bar extending through an aperture in said casing, said bar movably disposed astride the edge of the side wall of said camera, said looped arm in turn pivotally attached to linked arm means contiguous to and moved by means for adjusting the objective carrier of said camera within said camera wall, and screw means for adjusting said plate thereby changing the fulcrum relation of said swinging arm whereby said swinging lever and associated looped arm and linked arm means connected thereto may be adjusted to conform to the size and type of lens mounted upon the objective carrier aforesaid.

8. In a range finder for folding camera including an enclosed casing attachable to said camera, reflector viewing means contained within said casing, said viewing means including movable and fixed reflector elements, said movable reflector element attached to a swinging arm within said casing, said swinging arm operably contiguous to movable lever arm means pivotally mounted within said casing, said lever arm means adjustable with respect to the fulcrum relation of the swing of said movable lever arm means, said lever arm means attached to a looped bar within said casing, said looped bar extending through an aperture in said casing and movably disposed astride the edge of the side wall of said camera, said looped bar pivotally connected to linked arm means, said linked arm means contiguous to and cooperating with means for adjustably moving the objective carrier of said camera within the wall thereof.

9. In a range finder for folding camera including an enclosed casing attachable to said camera, reflector viewing means contained in said casing, said viewing means including movable and fixed reflector elements, said movable reflector element attached to a swinging arm pivotally mounted within said casing, said swinging arm in operable connection with movable lever arm means also mounted within said casing, the adjustment of said lever arm means made through the medium of set screws accessible from the exterior of said casing, said movable lever arm means attached to a looped bar extending through an aperture of said casing and movably disposed across the side wall of said camera, said looped bar pivotally connected to linked arm means slidably mounted within said camera and contiguous to and cooperating with means for adjustably moving said objective carrier of the camera aforesaid.

MORRIS SCHWARTZ.